United States Patent [19]
Chen et al.

[11] Patent Number: 6,021,437
[45] Date of Patent: Feb. 1, 2000

[54] PROCESS AND SYSTEM FOR REAL-TIME MONITORING OF A DATA PROCESSING SYSTEM FOR ITS ADMINISTRATION AND MAINTENANCE SUPPORT IN THE OPERATING PHASE

[75] Inventors: Ty-Foune Chen, Sassenage; Christian Caudrelier, Claix; Eric Espie, St. Martin d'Heres; Tony Reix, Echirolles, all of France

[73] Assignee: Bull S.A., Louveciennes, France

[21] Appl. No.: 08/892,162

[22] Filed: Jul. 14, 1997

[30] Foreign Application Priority Data

Jul. 17, 1996 [FR] France ................................ 96 08927

[51] Int. Cl.⁷ ................................................ G06F 13/00
[52] U.S. Cl. ...................... 709/224; 709/227; 709/229; 709/202; 709/203
[58] Field of Search .................... 395/200.54, 200.57, 395/200.59, 200.32, 200.33; 709/224, 227, 229, 202, 203

[56] References Cited

U.S. PATENT DOCUMENTS

| | | | |
|---|---|---|---|
| 5,655,081 | 8/1997 | Bonnell et al. | 395/200.32 |
| 5,742,762 | 4/1998 | Scholl et al. | 395/200.3 |
| 5,761,673 | 6/1998 | Bookman et al. | 707/104 |
| 5,802,518 | 9/1998 | Karaev et al. | 707/9 |
| 5,835,712 | 11/1998 | DuFresne | 395/200.33 |

OTHER PUBLICATIONS

S. Swanson et al.: "Real–Time Streaming and Java", Object Magazine, Jul. 1996, SIGS Publications, USA, pp. 36, 38–39, XP000670859.

"Disk Drive with Embedded Hyper–Text Markup Lanaguage Server" IBM Technical Disclosure Bulletin, vol. 38, No. 12, 1 Dec. 1995, p. 479, XP000588211.

Riva A et al: "Lispweb: A Specialized HTTP Server for Distributed AI Applications", Computer Networks and ISDN Systems, vol. 28, No. 7/11 May 1996, pp. 953–961, XP000600288.

Haetoenen K et al.: "TASA: Telecommunication Alarm Sequence Analyzer or How to Enjoy Faults in Your Network", 1996 IEEE Network Operations and Management Symposium (NOMS), Kyoto, Apr. 15–19, 1996, vol. 2, No. Symp. 5, Institute of Electrical and Electronics Engineers, pp. 520–529, XP000670826.

*Primary Examiner*—Ahmad F. Matar
*Assistant Examiner*—Philip B. Tran
*Attorney, Agent, or Firm*—Kerkam, Stowell, Kondracki & Clarke, P.C.; Edward J. Kondracki

[57] ABSTRACT

The present invention relates to a process and system for real-time monitoring of a data processing system for administration and maintenance support of the data processing system in the operating phase, which data processing system communicates in a client/server mode through interconnected networks (W), each client (WCL) comprising a browser (BRO) which supports a high-level hypertext language. Intelligent agents are installed in each server (WSE) for running, after the phrasing of client requests, a check on the status of each server, measuring and storing parameter information indicating the status and the behavior of the server at a given moment, which parameter information is automatically collected as a function of domains examined and systematically processed by the server so as to be offered in the form of presentation reports contained in dynamically evolving pages while the client's browser accesses the dynamic pages having the collected and processed information responding to a request.

15 Claims, 1 Drawing Sheet

PROCESS AND SYSTEM FOR REAL-TIME MONITORING OF A DATA PROCESSING SYSTEM FOR ITS ADMINISTRATION AND MAINTENANCE SUPPORT IN THE OPERATING PHASE

BACKGROUND OF THE INVENTION

1. Field of the Invention

The present invention relates to a process and system for real-time monitoring of a data processing system for its administration and maintenance support in the operating phase, which data processing system communicates in the client/server mode through interconnected networks, each client comprising a browser which supports a high-level hypertext language.

2. Related Art

Generally, a distributed management environment makes it possible to integrate the administration of systems, networks and user applications, the dialogue between the various machines of the system and/or between the various users being organized around requests and responses to these requests, the most common requests in a network being related to access to files or access to data. An application is said to be designed according to a "client/server" architecture when it is composed of two independent programs which cooperate with one another to carry out the same operation, each of which runs in its own environment (machine, operating system), while a programming interface using a language constituted by commands makes it possible to control their dialogue. The client/server mode has the advantage of allowing a user (for example of a simple microcomputer) called a client to consign part of his task or some of his operations to be executed to a server. In this way, the client has a greater computing capacity at his disposal than that of his microcomputer. Likewise, a client can address a specialized server and effectively outsource an operation, the server being under optimum conditions in terms of implementation and expertise by virtue of its specialization. In this context, up to the present time, providing real-time monitoring of a data processing system for its administration and maintenance support in the operating phase has involved the development of a specific application for each client, which represents a considerable drawback since, first of all, a technological choice of this type is very costly and prohibits simple upgrading since a modification, an addition or a new development inevitably requires a modification, an addition or a new development for each specific application.

Faced with this technical problem without any effective solution, a second fundamentally different approach, may be envisaged: developing a generic client application and only upgrading the server. Once this technical problem was presented differently, a solution was created by observing systems operating in interconnected networks and by applying this technique analogously to the administrative applications. In effect, the dialogue of all "client/server" entities can be established through one or more networks which can be interconnected (Internet, for example), in which case TCP/IP (Transmission Control Protocol/Internet Protocol) is the most commonly used protocol. These networks constitute a veritable world-wide "web" (as it is commonly referred to by one skilled in the art), making it possible to connect multimedia servers to one another and forming the equivalent of an immense hypertext multimedia document which is described using high-level hypertext languages such as, for example, the language HTML (HyperText Markup Language), the communications between the users (clients) and the servers being provided by the protocol HTTP (HyperText Transfer Protocol). A hypertext language like HTML defines the logical organization of the information, particularly with hypertext links (between texts, images, sounds, video sequences) for the development of content at the level of the server but not its formatting (that is, its organization into pages), which is handled by the client's software. A client in this context is equipped with a navigator (called a "browser" by one skilled in the art) used for browsing and scanning the information organized into pages offered by the various servers. However, these pages constructed by the servers are static, which also presents a substantial drawback when it is desirable to provide real-time monitoring of an administrative system in the operating phase. In effect, for efficient utilization, the evolution of the system over time (states of the machines, malfunctions, etc.) must be accessible and quickly known, and the pages constructed must not be presented in static form, but in a dynamically evolving form. Moreover, another drawback is apparent from the simple fact that the operation of a machine requires a minimum intervention and knowledge of its environment, and if a problem arises, it is necessary to establish a diagnosis, thus demonstrating a certain technical expertise, in order to rapidly discover the existence and then the source of the problem and to make a correction or possibly repair this machine, which is not necessarily the prerogative of the average user.

SUMMARY OF THE INVENTION

The object of the present invention is to eliminate the various drawbacks of the solutions of the prior art and to offer a process that is simple, effective, and inexpensive to implement and that allows the real-time monitoring of a data processing system for its administration and maintenance support in the operating phase by constructing and presenting the necessary information in the form of dynamically evolving pages.

For this purpose, the monitoring process mentioned in the preamble is noteworthy in that, in order to carry out this monitoring, intelligent agents are installed in each server for running, after the phrasing of client requests, a check on the status of each server, measuring and storing parameters indicating the status and the behavior of the server at a given moment, which information is automatically collected as a function of the domains examined and systematically processed by the server so as to be offered in the form of presentation reports contained in dynamically evolving pages constructed in this way, while the client's browser accesses these dynamic pages having the collected and processed information responding to his request.

Thus, according to the concept of the invention, and contrary to all expectations, an effective, fast, easy and inexpensive solution is offered thanks to the use of intelligent agents in the servers for constructing dynamic pages that can be browsed and read by the browsers of the clients, which clients need no development in order to browse and read the dynamic information received in response to their requests. Thus, these pages can dynamically adapt to the various requests, which also means that a plurality of clients asking the same question at a given moment do not necessarily receive the same response. This technological option makes it possible to reduce costs significantly, since any development for upgrading or expanding the initial system need only be implemented in the server, and no specific software needs to be provided or used by the client, who need only be equipped with a commercial browser, for example of the Netscape Navigator type (trademark registered by Netscape Communications Corporation) which is a low-cost, universally known and used product with which, moreover, most microcomputers are currently equipped.

In a remarkable way, the systematic processing of the information collected for the construction of the dynamic pages by the server is carried out in successive steps, each of which steps corresponds to the processing of this information by a particular module, the specific main modules being the following:

a page construction module which receives the client's request from the network and prepares the pages by collecting the necessary data in the appropriate levels depending on its operating system, then by presenting this data to a generic tool module for aiding in the construction, independent of operating system, a semantic knowledge module of the operating system which fetches the low-level data in an information construction module depending on the operating system, then constructs a high-level semantic representation of the data requested.

an information construction module of the operating system which uses commands depending on the operating system to acquire low-level data and provides an application interface for communicating with the semantic knowledge module of the operating system, a generic tool module for aiding in the construction of the pages in high-level hypertext language.

Advantageously, for the application of the monitoring process according to the invention, the construction of a page is implemented on the server end and is obtained by processing in various modules disposed at a plurality of levels according to their dependencies on the operating system. Two main levels are to be observed, the first of which relates to the construction of a page with the semantic knowledge of the operating system but without a direct interface with this operating system, while the second relates to the implementation of physical accesses to the information of the operating system.

BRIEF DESCRIPTION OF THE DRAWING

The following description in reference to the appended drawing, given entirely as a non-limiting example, will make it clearly understood how the invention may be implemented.

DESCRIPTION OF THE PREFERRED EMBODIMENT

Figure 1:
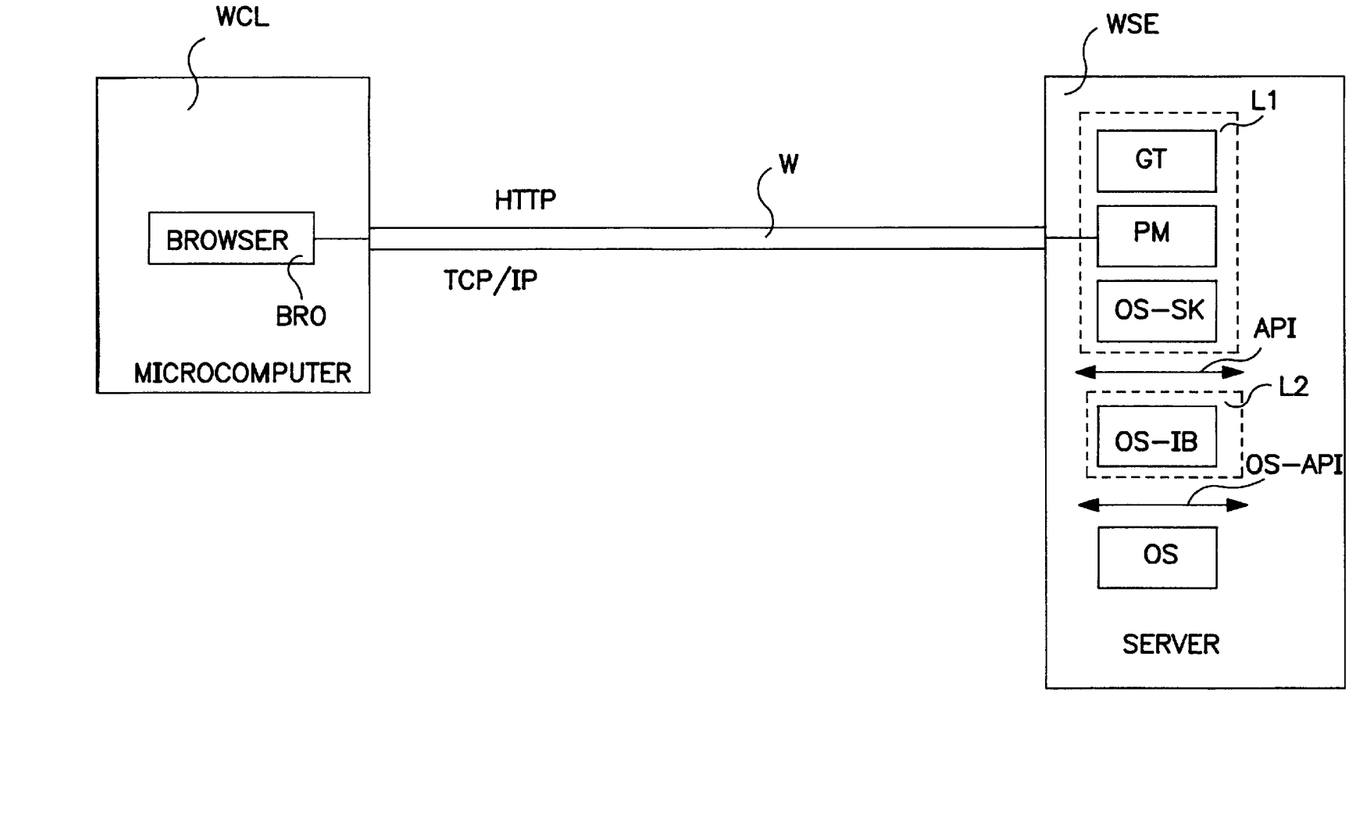
The sole FIGURE represents, in highly schematic fashion, an exemplary exchange of information (requests and responses to requests) between a client and a server communicating through interconnected networks, using the process according to the invention.

Within the scope of the application of this process, the general architecture (machines and networks) is based on the architecture of the interconnected networks ("web"). This means that when a server is connected to a local area network or to a wide area network(respectively a LAN or WAN to one skilled in the art), this process can be applied and thus rendered active from any machine connected to the network without having to install specific software or tools or even management agents (called "proxy agents" by one skilled in the art). In this way, a server WSE connected to the network W and used at any point in the world can be monitored from any other point in the world, from a microcomputer WCL connected to the network W, for example a simple PC comprising a browser BRO, preferably of the type which supports a high-level hypertext language HTML, such as the browser known as the NETSCAPE NAVIGATOR. All the presentation work is carried out on the client end mocrocomputer WCL using the browser BRO. The transfer of the data between the client WCL and the server WSE is carried out through the network W using the standard communication protocol HTTP over the multilayer protocol TCP/IP. When the client WCL sends a request because it wishes to display a new page on its screen, according to the present process, upon reception of this request, raw data are collected by the server WSE which then constructs synthetic data and adds information related to the alarms or problems encountered, then writes the code in HTML language which is transmitted through the network to the client in response to the request so as to be displayed after the text received in HTML language has been interpreted.

The systematic processing of the information collected for the construction of dynamic pages by the server is carried out in successive steps, each of which corresponds to the processing of this information by a particular module. As indicated above, for the application of the monitoring process, the construction of a page is carried out on the server end WSE and is obtained by processing in various modules disposed at a plurality of levels according to their dependencies on the operating system OS. Two main levels are to be observed, the first of which L1 relates to the construction of a page with the semantic knowledge of the operating system but without a direct interface with this operating system, and the second of which L2 relates to the implementation of physical accesses to the information of the operating system OS. The specific main modules are described below in a more detailed way.

The page construction module PM, when it receives the request from the client sent through the network W, prepares the pages by retrieving the necessary information in the appropriate levels depending on its operating system OS, then presents this information to a generic tool module GT for aiding in the construction, which is equally independent of the operating system OS. With the page construction module PM, it is possible to construct a graphic for representing a data set; likewise, a photograph can be used to present a concept or a specific hardware component. Each page is produced by grouping several modules. Each module has a particular semantic from a viewpoint in a format chosen from a set of possible events. For example, the correlation between the physical volumes, the volume groups, the logical volumes and the file systems can be presented from a volume group viewpoint in a chart format or from a file system viewpoint (all the physical volumes related to a given file system) in a graphical format. This latter characteristic makes it possible to facilitate the modification (semantic and format) of the way in which a semantic is presented. Thus, it is also possible to use programs in "Java" language (the data are presented dynamically on the client end). Advantageously, an aid can be associated with the construction of each page. The latter must contain all the information and explanations the user needs to understand, on the one hand, the significance of the information displayed and on the other hand, how to navigate within the labyrinth that is a "hyperscript" in HTML language. All the texts displayed on the client's screen can be internationalized, that is, they can be read in the language of the server queried or in that of the client who sent the request.

The generic tool module offers a set of tools to aid in the construction of pages in HTML language in order to construct two- or three-dimensional graphical representations. The tools so offered are not semantically dependent on the operating system OS. The following are examples of tools provided:

The type sequence program or "scripting" tool (in the language of one skilled in the art) is a portable tool used to write the modules necessary to the application of the present process, which tool has the following advantages:

easy and independent access to the basic commands of the operating system OS which make it possible to manipulate the files and execute the commands of this operating system, an efficient "debugging" and "trace" service, a satisfactory level of performance, true portability to different operating systems, a syntax which allows easy maintenance and upgrading, a language which makes it possible to structure and represent complex data, the ability to expand the language by interfacing with the C language.

A set of graphical tools independent of the operating system such that two-dimensional and three-dimensional graphics are produced simply and rapidly, photographs are incorporated into HTML pages, and evolving graphics are produced as a function of phenomena which themselves evolve slowly.

Tools which make it possible to take full advantage of the HTML language.

A tool to aid in the construction, which offers a generic application interface which is used by each page.

The semantic knowledge module OS-SK, which is dependent on the operating system, collects the low-level data in an information construction module OS-IB dependant on the operating system present at the second level L2, then constructs a high-level semantic representation (logical structure) of the data requested. For example, the correlation between the physical volumes specific to an operating system, such as a system under UNIX (registered trademark in the US and other countries, exclusively licensed through the X/OPEN Company Ltd.), the volume groups, the logical volumes and the file systems can be presented beginning with the acquisition of the basic data, then grouping this data by volume group from a logical viewpoint. In greater detail, the module OS-SK comprises three parts. A first part, directly related to the module PM, contains the code that makes it possible to collect semantic information and present it. A second part, which is the manager of the logical structures containing the code that makes it possible to construct semantic structures by grouping individual basic structures which for example present the relationship between adapters of local area networks, interfaces and daemons. Finally, a third part, which is the manager of the basic structures containing the code that makes it possible to construct basic structures, for example the information related to each local area network adaptor. Moreover, in order to minimize the time needed to respond to a request or to construct a page in HTML language, or when several users successively initiate a request for the same page, a plurality of cache memories are advantageously used. These cache memories are provided for saving complex acquisition information rather than dynamic information. They are structured as a function of their level of utilization (page, logical structure, basic information). A duration and/or a condition is associated with each block stored in a cache memory. Thus, the page cache memory, which stores complete pages such as those related to a system configuration, is associated with the first part. The logic structure cache memory, which stores structures such as those related to a file system, logic volumes, volume groups and physical volumes is associated with the second part. The basic structures cache memory, which stores structures such as the activity or characteristics of a particular physical volume, for example a disk is associated with the third part.

The information construction module OS-IB of the operating system, which is dependent on the operating system OS, uses commands depending on the operating system to acquire low-level data and offers an application interface API for communicating with the semantic knowledge module OS-SK of the operating system; it is connected to the operating system OS through an application interface OS-API. According to the present process, it is equipped to present information relative to the system configuration, the system utilization, the alarms and the reliability of the system, which information corresponds either to instantaneous values, historical values, or tendencies. Some values relative to the characteristics of the operating system can be accessed by directly calling commands of the operating system (for example, in order to obtain complete software and hardware configurations in a given operating system such as AIX, Windows NT, etc.) whereas others are produced by specific daemons. In order to offer the module OS-SK a uniform view of all the necessary information, the module OS-IB uses an application interface API which makes it possible to hide the internal complexity. In fact, the module OS-IB is a module that is completely independent of the higher level. In some cases, the acquisition of certain immediate values cannot be carried out because one or more successive selective analyses ("snapshots") are necessary in order to obtain a result or to give representative information. The immediate values make it possible to know and to rapidly display, for example, the instantaneous state of a machine, an instantaneous software or hardware configuration, the processors consuming the most power at a given moment, the instantaneous activity of the "cpu", the instantaneous status of the alarms, etc. The immediate values also make it possible to establish effective diagnoses relative to fundamental components of a machine. The so-called historic values are saved in order to be used either to display changes of states, the evolution of values with a graphical presentation, etc., or to calculate tendencies or make predictions. One of the intelligent agents used in the server and in particular integrated into the module OS-IB is the agent RSF (Remote Services Facilities), which is an event management agent designed to send real-time notifications in a given mode. The utilization of the agent RSF makes it possible to provide a structure for the alarm buffer registers as well as a history of the alarms, which considerably facilitates the search for a particular alarm. Moreover, associated with each immediate or instantaneous value is a threshold which can easily be modified by the user according to his needs, a threshold which, when exceeded, triggers an event. This event is then stored in a register provided for recording the history of events with a date, an indicator name related to the event, a threshold value, etc., and the last event recorded can be used to determine whether an instantaneous value is respectively above or below a threshold, and then to display on the client's screen the correct color (respectively red or green) of the corresponding icon. The agent RSF is warned of new events and activates the triggering of an alarm when a threshold under observation is exceeded, with the possibility of deferring the triggering of the alarm until, for example, the threshold is observed to have been exceeded two or three times. Of course, the triggering of an alarm by the agent RSF is actually only implemented when no alarm for this threshold has already been triggered, or when a previous alarm has been deleted. Thus, a threshold may be considered to trigger an event each time a value exceeds or falls below this threshold or when a value has exceeded or fallen below this threshold two or three times. The agent RSF frequently scans the error log file "errlog file" and thus efficiently detects a new alarm. When an alarm is detected, the description of this alarm is stored in a file associated with the software or hardware element which caused this alarm. The agent RSF saves a history of all the alarms. The alarms are suppressed either after the intervention of the user, or upon the expiration of a predetermined time period when the user has initiated a request specific to a page which has this alarm.

For better understanding, the programming interface API between the module OS-IB and the module OS-SK can be divided into two parts which offer an efficient view of all the information acquired by the module OS-IB. The first part essentially relates to files containing information which is mainly fixed. The second part includes several C language libraries which provide an interface with the buffer registers containing the immediate values as well as with the files containing the various histories. This second part is generic, which means that it is not necessary to add a new function to the interface API when a new class with new attributes is added. All the classes and all the attributes are seen as unique identifiers. A new entry for the new class is added into an abstract description of all the classes. An activity buffer register is connected to this second part, which register is used like a programming interface for data stored in a shared memory and is filled by a second intelligent agent ASRX (Automatic Site Reporter for Unix) with information read in the operating system. A buffer register containing the history of the activities is constructed with immediate values obtained in the activity buffer register using the second part of the programming interface API. A threshold manager saves the prior values of a buffer register so as to be capable of determining if a value has exceeded a threshold. This manager directly calls the agent RSF to inform it that a new event has occurred and that it must analyze whether or not an alarm must be produced. The code of this manager can be generic, since all the data inspected is of the representative information type; for example, a threshold can be placed on the size of each file system. Likewise, a tendency manager saves the prior values of a buffer register so as to be capable of warning that a limit is about to be reached, for example the number of time units in which the maximum size of a file system would be reached. In this context, the agent RSF interrogates the file "errlog" as well as various specific files and fills the alarm buffer register, the configuration history and alarm history files and finally calls the audible warning signals ("beepers"), when they exist. In fact, during the monitoring of the log files of the system, a problem is detected by the agent RSF when an error occurs, since specific messages destined for these log files are written by an application such as "errlog." When a problem is detected, if a threshold or a set of thresholds included in such a message is also exceeded within a determined time period, a reaction is triggered. The information relative to the instantaneous configuration specific to the detection of and the reaction to the problem found by the agent RSF is stored in files of the agent RSF which contain message sources, message "templates" and the messages saved.

Each message source that the agent RSF monitors and transmits has the following attributes:

a unique identifier of a character string used by the agent RSF, a path to the log file of the source monitored, a path for executing an action when the passing of a threshold is detected, a time interval at the end of which a piece of detected information is deleted, a time interval during which the agent RSF scans for the arrival of new messages from a source.

In this case, the commands which manipulate the message source command file can, for example, be the following:

mkmsrc: this command alerts the agent RSF to monitor a source which has the attributes described above, lsmsrc: this command triggers the printing of various attributes of the sources contained in the command file, chmsrc: this command makes it possible to modify the attributes of an existing source that is being monitored, rmmsrc: the source with the identifier specified no longer needs to be monitored for the reception of messages.

A list of messages is saved for each source monitored by the agent RSF, and each message has the following attributes:

a unique identifier used by the agent RSF to detect a determined message in the source, a value of an integer which defines how many messages comprising a threshold can be detected before an action is executed, a period of time during which a detected message must be considered valid; if a message is detected and it remains below a determined threshold, it will be deleted after this period of time, the maximum number of messages which can be stored in a register after detection.

The commands which manipulate the files containing the message "templates" can, for example, be the following:

lsmsg: this command makes it possible to list the messages in each source monitored by the agent RSF, mkmsg: this command makes it possible to alert the agent RSF to search the source given for a specified message having the attributes described above, chmsg: this command makes it possible to change the attributes of a message which is sought by the agent RSF, rmmsg: this command makes it possible to alert the agent RSF so that it no longer searches for the determined message associated with a monitored source.

Moreover, a daemon of the agent RSF will periodically scan each of the sources monitored, searching for new occurrences of the messages monitored. When one of them is found, the count relative to the number of occurrences of this message is incremented, and if this count exceeds the determined threshold value during the determined time period, the specific action is executed. This daemon will also periodically clean up the files when necessary.

A second intelligent agent, the agent ASRX, is also present in the module OS-IB, and its principal object is the measurement and management of a machine; it makes it possible to automatically collect information which is then automatically produced in the form of presentation reports which are also automatically updated. The agent ASRX is advantageously used to produce the pages relative to the utilization of the machines monitored; in particular, it makes it possible to collect the raw data relative to the utilization of the machines, to calculate the usable data in order to supply the immediate data calculated and to calculate the passing of thresholds, as well as to produce the history (day, week, month, from a given moment) of the data calculated. Any modification in the system must be supplied, on the one hand, to the data collector of the agent ASRX, so it is necessary to add to it the new attributes in the classes, the new classes, the file system, etc., and on the other hand to the tool for creating presentation reports of the data, which is inside the agent ASRX, since the new attributes, the new classes and the new calculation modes are necessary for this tool to create its reports. The agent ASRX is in fact constituted by three main parts, which are the data collector, the data manager, and the data reporter.

The data collector runs on each machine monitored. The data is collected in patterns that make it possible to determine which objects must be monitored in order to collect the basic information necessary to obtain a steady, reliable process. Data collection is based on the design of a basic structure which facilitates the addition of new objects to be monitored. The main characteristics of the data collector be summarized as follows: a reasonable memory size, a minimized cpu consumption so as not to affect the performance of the machine, an execution which does not cause any failure of the machine and which maintains its integrity, simple porting to various types of operating systems and simple testing, easy installation in various types of tools, simple management and implementation of the collection without any loss of data during a determined period.

The chief functions of the data collector are the following:
 the data is collected in two different ways:
  at the outset, certain attributes defined o as to be constant until the next reinitialization of the machine are collected once, for example the version of the system, and must not be dynamically changed,
  at a set date, certain attributes can be collected according to the year, the month, the week, the day and the time (hour, minute).
 Specified dates and times for the collection of data must be configured for each object. A method calling mechanism makes it possible to add new objects to be monitored (system call functions, system commands). The objects to be monitored are classified using a given object model and they satisfy the following criteria:
  allowing the calculation of the mean time to failure (MTTF), the mean up time (MUT) or mean down time (MDT) of a hardware or software component,
  recording any error or event which occurs such as:
   a system failure and its cause (support, power loss, etc.), the reinitialization of the system,
   "hardware" errors,
   "software" errors (kernel, transmission, applications),
   changes in system configuration,
  to record the main activities of the components:
   statistics relative to the system load,
   cpu time,
   disk activity (number of inputs/outputs),
   number of operations,
   transmission activities,
  to record the initial "hardware and software" configurations for the data collector (list of software installed, list of cards installed).

All this data is extracted from the object data manager. The standard configurations are provided to facilitate the production of statistics and the analysis of availability. The system resource controller is advantageously used to manage the data collector (starts/stops, validation/invalidation of the "trace." In the case in which the data collector is placed on interrupt, the system resource controller records the events in the error record file.

The data manager itself makes it possible to rearrange the data collected from the various machines observed so as to facilitate access relative to predefined criteria (date, version, machine model, etc.). The chief characteristics of the data manager can also be summarized: a large storage capacity, good performance in terms of requests, ease in handling complex requests and ease of management. The data are calculated and saved in files. The main functions processed by the data manager are the following:
 creation of files or "data bases" (arrays, relations, indices, etc.), design of files or "data bases" for easy access, for adding classes of new objects to be monitored and for improving performance,
 the insertion of reliable, available and easy-to-use data into the files or "data bases"; all the new objects collected in the machines observed are placed in these files or "data bases" in which shared information is constructed (without scanning),
 the high-level requests are transmitted to these files or "data bases" in order to allow: the execution of presentation reports, data analysis, the running of interactive applications such as browsing; programming interfaces for the operations to be executed in these files or "data bases" ("get", "search", "filter", etc.) are provided to facilitate the writing of applications.

The organization of these files or "data bases" is designed to satisfy all the requests sent by the applications. A relational base, for example Oracle (trademark of Oracle Corporation) can be used to manage data in combination with any tool required for the development of applications.

The data reporter in turn makes it possible to generate standard presentation reports from files in which all the raw data collected is stored. The chief characteristics of the data reporter can be summarized as follows: ease of use, control of requests by means of graphical user interfaces; the generation of reports must be able to use existing tools. The results are classified so as to provide excellent availability and reliability of the system, high-performance system activities, and easy "hardware/software" configuration of the system. The various results can be effectively obtained and used following the definition of a general presentation report or the definition of a detailed presentation report, while interactive applications are provided such as, for example, a browser for reading certain fields of the files, as well as a graphical presentation on a screen and its printing on a printer.

More precisely, the object of the general presentation report is to provide a synthetic, global view of the reliability and availability of the system from indicators such as the mean time to failure (MTTF), the mean time between failures (MTBF), the mean up time (MUT) or mean down time (MDT) of a hardware or software component. The marking of errors which occur frequently, the correction of the main errors for a given "software" version, the distribution of the errors and the utilization of components that are standard in terms of cpu time, input/output volume, network activity and resources used are also facilitated by the definition of the general presentation report. The activity of the components is relative to a wide variety of utilizations; the measurements ("metrics")) offered are for example used to perform a count, to determine a load or a balancing of work or samples to be examined, etc. Thus, the analysis of the work load as a function of the resources in terms of response time to a transaction provides a significant element for efficient analysis of availability, as well as an indication of the resources responsible for the problems encountered. All of this requires the utilization of components for measuring and collecting the response times to a transaction (disk, memory, cpu times, networks, etc.). Generally, the system resources which can cause problems for an application are the processor, the memory, the disks, the chains, the interprocess communications, the networks, the functional units, etc.

Likewise, the object of the detailed presentation report corresponds to a specific utilization of the files for a particular object. Thus, the requirements must be clearly expressed in order to provide tools dedicated to the extraction of data in these files. The precise form of a statistical analysis of data is specific to each utilization. Its design makes it possible to produce standard presentation reports on the availability and reliability of the machines and components, which corresponds to a global view of the product monitored in terms of mean time to failure (MTTF), mean up time (MUP) or mean down time (MDT), etc., as indicators on the "hardware" or "software" components. A correlation can also be established between the activities of the components and the errors. Its design also makes it possible to present general information on the contents of the files: the date of observation (start, end, number of machines, model, version, etc.), a list of the machines observed by activity (development, configuration management, files, remote processing, etc.), the number of error types detected during the observation, a list of the models observed, a list of the operating systems observed by version, and the number of machines observed for each model. As a result of to this design, services are also provided for carrying out the analysis to determine the cause of the error. An interactive application is necessary to implement this characteristic, and the data representation uses a graphical or textual presentation.

The contents of the files also provide a synthetic view of all the information, which helps to choose the machines to be observed, and they include the number of existing versions in the files, the start and the end of the observation period for a version of a system, as well as the number of machines which satisfy the criteria of the models and the versions.

The view of a machine can be divided, causing various criteria to appear: a view relative to the position, a view relative to the model of the machine, a view relative to the errors, and a view relative to the "hardware" or "software" components.

In this way, the process according to the invention provides a general state of the server monitored, including the behavior of the machine in terms of abnormal events, failures or deteriorations in performance. In fact, it provides a graphical application which makes it possible to execute system management tasks by manipulating objects. This process is built on various concepts which take into account the operating system, the storage of the data, the network in question, the printing, and the applications. Each concept involves precisely identified objects, for example the concept related to the operating system groups the cpu, the processes, the daemons, the number of users connected, etc. For each object managed, the following elements are covered: the object identification attributes, the object configuration attributes, the object utilization and the performance attributes, the attributes for access to the objects and the status information of the objects (active or inactive).

The present process relates to the aspects of the software and hardware configurations, to the use of the system resources in real time, as well as to the various tendencies and the handling of events. It makes it possible to use advantageously organized functionalities to carry out the following various operations:

the configuration oriented operation, which provides a global view of the software and hardware configuration of a server, the network management oriented operation, which provides a synthetic view relative to the availability of the resources in question, the utilization oriented operation, which makes it possible to monitor the capacity of the resources to meet current and future needs; it involves measuring the utilization of the main software and hardware resources and makes it possible to provide a visual check on the server, the change oriented operation, which makes it possible to save any record of a software or hardware change, the event oriented operation, which makes it possible to detect, produce presentation reports on, search for and correct the problems related to the message sending service; an analysis of the presentation reports relative to the problems makes it possible to prevent the reoccurrence of these problems, the error management oriented operation, which makes it possible to re-establish normal services for the user, the service oriented operation, which makes it possible to control the services used most often such as printing, electronic mail, file transfers, initialization of remote processing, etc.

the security oriented operation, which makes it possible to provide the status of the control of access to local or distributed resources from the user point of view, for example the statistics on attempted intrusions, the application oriented operation, which makes it possible to manage various applications (configuration, installation, client, etc.); it supplies details on the status, the utilization, and the consumption of resources relative to these applications.

In conclusion, according to the present monitoring process, an effective, fast, easy and inexpensive solution is offered thanks to the utilization of intelligent agents in the servers for constructing dynamic pages which can be browsed and read by the browsers of clients, which clients need no development in order to browse and read the dynamic information received in response to their requests. Thus, these pages can dynamically adapt to the various requests. This technological option makes it possible to reduce costs significantly, since any development for upgrading or expanding the initial system need only be implemented in the server, and no specific software needs to be provided or used by the client, who need only be equipped with a commercial browser, which is a low-cost, universally known and used product with which most microcomputers are currently equipped. As a result of this process, it is possible to operate on the main information which makes it possible to maintain proper functioning of the machines. A simple interface for the system resources and the services is supplied and serves to hide the complexity of the operating systems. This process is of particular interest to users who have no expertise in the field of systems management, and any user in charge of the operation of a machine is thus provided with a valuable aid, a large quantity of useful information which allows him to perform an effective intervention for corrective maintenance or recovery of resources. According to the present process, which can easily be launched from a microcomputer connected to a local area network, a simple system configuration and a global view of the behavior of the machine are provided, while the same graphical interface can be used in any machine of the system. Portability to various operating systems is made easy. The users managing the various machines with the same graphical interface and the same concepts can, without training, quickly understand whether or not a server is operating normally, and establish efficient contact with support teams by providing significant information for a proper diagnosis. Such an approach makes it possible to considerably reduce down time due to the failure of a server and, in addition, allows powerful and effective use of the information supplied according to the present process by an expert system.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

We claim:

1. A process for real-time monitoring of a data processing system for administration and maintenance support of the system in an operating phase, said data processing system being arranged to communicate in a client-server mode through interconnected networks, each client including a browser which supports a high-level hypertext language, comprising the steps of:

installing intelligent agents in each server for phrasing a client request via the intelligent agents in each server, running a check on the status of each server, measuring and storing parameter information indicating the status and behavior of the server at a given moment, automatically collecting the parameter information as a function of domains examined and systematically processed by the server, offering the information in the form of presentation reports contained in dynamically evolving pages, while accessing said dynamic pages having the collected and processed information responding to a request via the clients browser carrying out systematic processing of the parameter information collected for construction of the dynamic pages by the server in successive steps, each step corresponding to the processing of said information by a particular module, including a page construction module, a semantic knowledge module, an information construction module and a generic tool module, receiving a client's request in the page construction module from the network and preparing the pages by collecting the necessary data in appropriate levels depending on the construction module's operating system, then, by presenting said data to the generic tool module for aiding in the construction, independent of the operating system, fetching low-level data in the information construction module depending on the operating system via the semantic knowledge module of the operating system, then constructing a high-level semantic representation of the data requested, acquiring low level data utilizing commands to the information construction module of the operating system to acquire said low-level data and communicating with the semantic knowledge module of the operating system via an application interface, and constructing the pages in high-level hypertext language via the generic tool module for aiding in the construction of the pages in high-level hypertext language.

2. A monitoring process according to claim 1, characterized in that for the application of said process, the semantic knowledge module of the operating system comprises three parts, a first part directly contained to the page construction module and containing a code that makes it possible to collect and present semantic information, a second part for managing of logical structures containing the code to construct semantic structures by grouping individual basic structures, and a third part for managing basic structures containing the code to construct basic structures.

3. A monitoring process according to claim 2, characterized in that for the application of said process, a first intelligent agent in the server, integrated into the information construction module of the operating system, is an event management agent adapted to send real-time notifications in a given mode, the utilization of which makes it possible to provide alarm buffer registers and a history of alarms so as to facilitate the search for a particular alarm, said alarm buffer registers having an alarm threshold associated with each instantaneous threshold value which, when exceeded, triggers an event.

4. A monitoring process according to claim 3, wherein for the application of said process, a second intelligent agent in the server, integrated into the information construction module of the operating system, is an agent for performing the steps of:

measuring and managing a machine, automatically collecting information which is then automatically produced in the form of presentation reports that are automatically updated, producing pages relating to the utilization of the machines being monitored, collecting raw data relative to the utilization of the machines, and calculating usable data to supply instantaneous data to calculate the passing of thresholds and to produce the history of the data calculated, said second agent being constituted by three main parts, a data collector which collects the data in patterns to determine objects to be monitored so as to collect the basic information necessary, a data manager to rearrange the data collected from the various machines observed so as to facilitate access relative to predefined criteria, and a data reporter to generate standard presentation reports from files in which all the raw data collected are stored.

5. A monitoring process according to claim 4, wherein organized functionalities are used to carry out the following various operations:

a configuration oriented operation to provide a global view of the software and hardware configuration of a server, a network management oriented operation to provide a synthetic view relative to the availability of the resources in question, a utilization oriented operation to monitor the capacity of the resources to meet current and future needs, which involves measuring the utilization of the main software and hardware resources and providing a visual check on the server, a change oriented operation to save any record of a software or hardware change, an event oriented operation to detect, search for and correct problems relative to message sending, and produce presentation reports on an analysis of the presentation reports relative to the problems for preventing reoccurrence of the problems, an error management oriented operation to re-establish normal services for the user, a service oriented operation to control most often used services, a security oriented operation to provide the status of the control of access to local or distributed resources from a user point of view, and an application oriented operation to manage various applications by supplying details on the status, the utilization, and the consumption of resources relative to such applications.

6. A system for real-time monitoring of a data processing system for administration and maintenance support of the data processing system in an operating phase, said data processing system adapted to communicate in a client-server mode through interconnected networks, each client including a browser which supports a high-level hypertext language, comprising;

intelligent agents in each server for running a check on the status of each server after phrasing of client requests, means for measuring and storing information indicating the status and the behavior of the server at a given moment, means for automatically collecting said information as a function of domains examined and systematically processing the information by the server, means for offering the information in the form of presentation reports contained in dynamically evolving pages while the client's browser accesses said dynamically evolving pages having the information collected and processed in response to a request, wherein the systematic processing of the information collected for construction of the dynamic pages by the server is carried out in successive steps, each step corresponding to processing of said information by a particular module, including:

a page construction module which receives a client's request from a network and prepares the pages by collecting necessary data in appropriate levels depending on the operating system of the page construction module, then presenting said data to a generic tool module for aiding in the construction of the pages, independent of the operating system, a semantic knowledge module of the operating system for fetching low-level data in an information construction module and then constructing a high-level semantic representation of the data fetched, an information construction module of the operating system which uses commands depending on the operating system to acquire low-level data and provides an application interface for communicating with the semantic knowledge module of the operating system, and a generic tool module for aiding in the construction of the pages in high-level hypertext language.

7. A monitoring system according to claim 6, characterized in that the semantic knowledge module of the operating system comprises three parts, a first part directly connected to the page construction module, which contains a code that makes it possible to collect semantic information and present said information, a second part which manages logical structures containing the code which makes it possible to construct semantic structures by grouping individual basic structures and a third part which manages basic structures containing the code which makes it possible to construct basic structures.

8. A monitoring system according to claim 7, further including alarm buffer registers and characterized in that the server, integrated into the information construction module of the operating system, includes a first intelligent agent functioning as an event management agent for sending real-time notifications in a given mode, the utilization of which provides a history of alarms so as to facilitate the search for a particular alarm buffer register, said alarm buffer registers having an alarm threshold associated with each instantaneous threshold value which, when exceeded, triggers an event, said alarm threshold being capable of modification by a user.

9. A monitoring system according to claim 8, wherein the server is integrated into the information construction module of the operating system, said server including a second intelligent agent for measuring and managing a machine, and for automatically collecting information, said information then being automatically produced in the form of automatically updated presentation reports, said second agent being used to produce pages relating to the utilization of the machines monitored, thereby making it possible to collect raw data relative to the utilization of the machines, to calculate the usable data in order to supply the instantaneous data calculated, to calculate the passing of thresholds and to produce the history of the data calculated, said second agent being constituted by three main parts, a data collector for collecting data in patterns to determine which objects must be monitored so as to collect the basic information necessary, a data manager for rearranging the data collected from various machines observed so as to facilitate access relative to predefined criteria, and a data reporter for generating standard presentation reports from files in which all the raw data collected are stored.

10. A monitoring system according to claim 9, wherein organized functionalities are used to carry out the following various operations:

a configuration oriented operation which provides a global view of software and hardware configurations of a server, a network management oriented operation which provides a synthetic view relative to availability of resources in question, a utilization oriented operation for monitoring the capacity of the resources to meet current and future needs, which involves measuring the utilization of the main software and hardware resources and providing a visual check on the server, a change oriented operation for saving a record of any software or hardware change, an event oriented operation for detecting, and producing presentation reports on, searching for and correcting problems relative to message sending, analyzing of the presentation reports relative to system problems with a view toward preventing reoccurrence of the problems, an error management oriented operation for re-establishing normal services for the user, a service oriented operation for controlling the most often used services, a security oriented operation for providing status information relative to the control of access to local or distributed resources from a user's point of view, and an application oriented operation for managing various applications by supplying details on the status, the utilization, and the consumption of resources relative to such applications.

11. A system for real-time monitoring of a data processing system for administration and maintenance support of the system in an operating phase, and for communicating in a client-server mode through interconnected networks, each client comprising a browser which supports a high-level hypertext language, comprising intelligent agents in each server for phrasing a client request via the intelligent agents in each server, means for running a check on the status of each server, means for measuring and storing parameter information indicating the status and behavior of the server at a given moment, means for automatically collecting the parameter information as a function of domains examined and systematically processed by the server, and means for offering the information in the form of presentation reports contained in dynamically evolving pages, while accessing said dynamic pages having the collected and processed information responding to a request via the client's browser, wherein said dynamically evolving pages are constructed by carrying out systematic processing of parameter information by the server in successive steps, each step corresponding to the processing of said information by a particular module, including a page construction module, a semantic knowledge module, an information construction module and a generic tool module, the page construction module being configured to receive a client's request from the network and prepare the pages by collecting the necessary data in appropriate levels depending on the construction module's operating system, and then present said data to the generic tool module for aiding in the construction, independent of the operating system, the information construction module being configured to fetch low-level data depending on the operating system via the semantic knowledge module of the operating system, construct a high-level semantic representation of the data requested, acquire low level data utilizing commands to the information construction module of the operating system to acquire said low-level data and communicate with the semantic knowledge module of the operating system via an application interface, and the generic tool module being configured for aiding in the construction of the pages in high-level hypertext language.

12. A system according to claim 11, further comprising means for carrying out systematic processing of the parameter information collected for construction of the dynamic pages by the server in successive steps, each step corresponding to the processing of said information by a particular module, including a page construction module, a semantic knowledge module, an information construction module and a generic tool module, means for receiving a client's request in the page construction module from the network and preparing the pages by collecting the necessary data in appropriate levels depending on the construction module's operating system, means for presenting said data to the generic tool module independent of the operating system for aiding in the construction of the dynamic pages, means for fetching low-level data in the information construction module depending on the operating system via the semantic knowledge module of the operating system, means for constructing a high-level semantic representation of the data requested, means for acquiring low level data utilizing commands to the information construction module of the operating system to acquire said low-level data and communicating with the semantic knowledge module of the operating system via an application interface, and means for constructing the pages in high-level hypertext language via the generic tool module for aiding in the construction of the pages in high-level hypertext language.

13. A system according to claim 11, characterized in that the semantic knowledge module of the operating system comprises three parts, a first part directly connected to the page construction module, said first part containing a code that makes it possible to collect and present semantic information, a second part for managing of logical structures containing the code to construct semantic structures by grouping individual basic structures, and a third part for managing basic structures containing the code to construct basic structures.

14. A system according to claim 11, characterized in that for the application of said process there is included alarm buffer registers and a first intelligent event management agent in the server integrated into the information construction module of the operating system, said event management agent being adapted to send real-time notifications in a given mode, for utilizing said alarm buffer registers to provide a history of alarms so as to facilitate the search for a particular alarm, said alarm buffer registers having an alarm threshold associated with each instantaneous threshold value which, when exceeded, triggers an event.

15. A monitoring process according to claim 14, wherein for the application of said process, there is included a second intelligent agent in the server for measuring and managing a machine, said second agent being integrated into the information construction module of the operating system, and adapted to automatically collect information which is then automatically produced in the form of presentation reports that are automatically updated, means for producing by said second agent the pages relating to the utilization of the machines monitored, means for collecting the raw data relative to the utilization of the machines and calculating the usable data to supply the instantaneous data to be calculated, means for calculating the passing of thresholds and producing the history of the data calculated, said second agent being constituted by three main parts, a data collector which collects the data in patterns to determine objects to be monitored so as to collect the basic information necessary, a data manager to rearrange the data collected from the various machines observed so as to facilitate access relative to predefined criteria, and a data reporter to generate standard presentation reports from files in which all the raw data collected are stored.

* * * * *